May 31, 1960 — C. F. BRITTON — 2,938,349
WHEEL CYLINDER CONSTRUCTION

Filed Aug. 4, 1955 — 2 Sheets-Sheet 1

INVENTOR.
CLAYTON F. BRITTON
BY John A. Young
ATTORNEY

INVENTOR.
CLAYTON F. BRITTON
BY John A. Young
ATTORNEY

United States Patent Office 2,938,349
Patented May 31, 1960

2,938,349
WHEEL CYLINDER CONSTRUCTION

Clayton F. Britton, South Bend, Ind., assignor to Bendix Aviation Corporation, South Bend, Ind., a corporation of Delaware Filed Aug. 4, 1955, Ser. No. 526,353
3 Claims. (Cl. 60—54.6)

This invention relates to a wheel cylinder construction which enables suitable mounting of the wheel cylinder onto a support plate in a vehicle brake.

In mounting the wheel cylinder, it was previously necessary in many instances to rotate the wheel cylinder so that the axis of the cylinder bore was not located parallel to the horizontal axis of the brake. The reason for this was that certain of the wheel supporting structure which extended vertically presented an obstruction which prevents location of the fluid motor at the uppermost part of the support plate.

When it is necessary to rotate the fluid motor from its uppermost position, additional support must be provided for the brake shoe which is elevated by rotation of the brake. Quite often, this additional support is in the form of an eccentric. Whatever expedient, however, in the form of additional brake shoe support, there are always problems of added cost, greater complication in assembly, and maladjustment of the brake.

It is an object of the present invention to enable location of the fluid motor at the uppermost part of the support of the brake without interference from other wheel supporting structure.

Through the attainment of this prior objective, it is my purpose to eliminate previously required shoe supporting structure and thus reduce the number of brake parts which contribute to cost and create complexity in the brake.

An additional feature of the invention is that a pilot boss, bleeder boss, and an inlet boss are constructed and arranged to permit ingress and egress of hydraulic fluid at quarters which were heretofore too constricted to permit location of the fluid motor.

A further prominent part of the invention is that the new construction for the inlet and bleed bosses has not necessitated an increase in the size of the fluid motor.

Other objects and features of the invention will become apparent from a consideration of the following description which proceeds with reference to the accompanying drawings, wherein.

Figure 3:
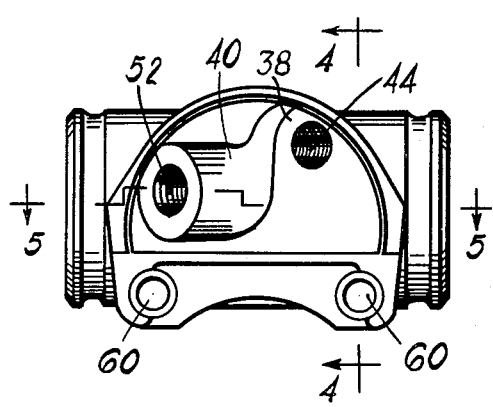
Figure 3 shows the base of the fluid motor which lies flat against the support plate, the view being taken in the direction indicated by the arrows 3—3 in Figure 2.
Figure 4:
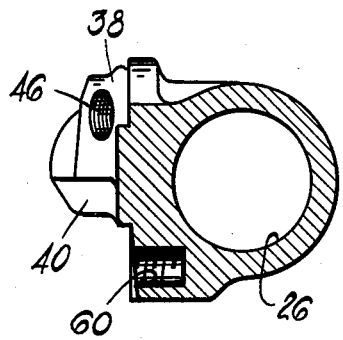
Figure 5:
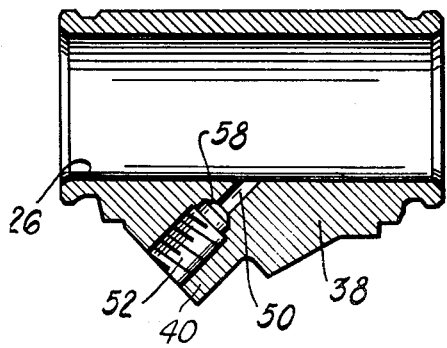
Figure 6:
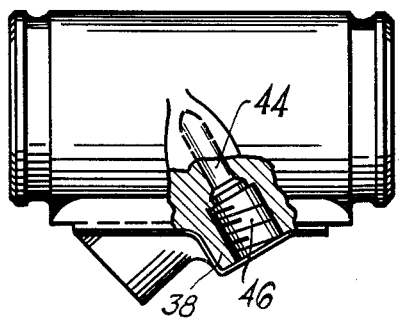

Figures 4 and 5 are section views taken respectively on the lines 4—4 and 5—5 of Figure 3; and Figure 6 is a top view of the fluid motor shown in Figure 3 with a portion thereof broken away to better illustrate the bleeder passage.

Figure 1:
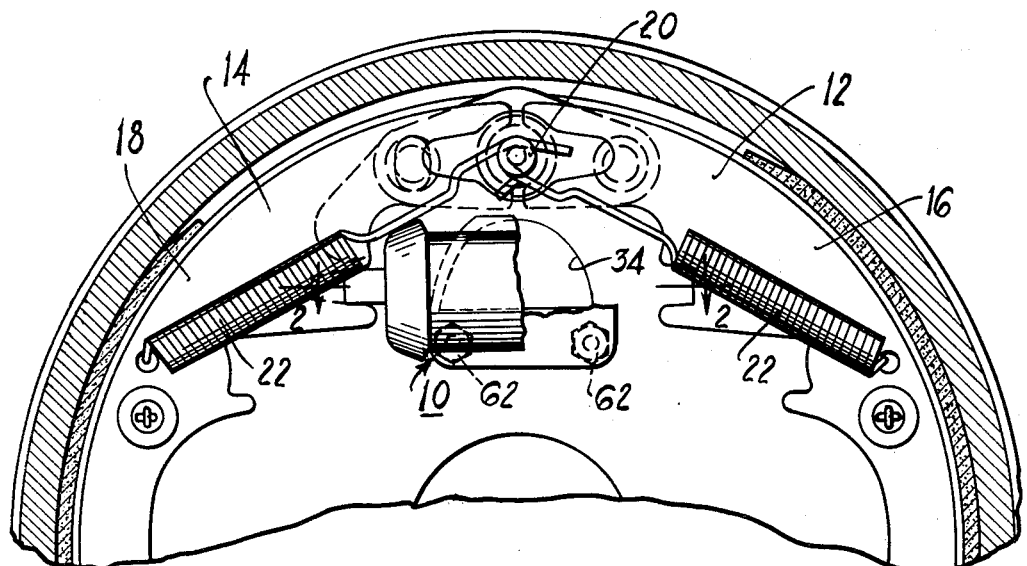
Figure 1 is a fragmentary front elevation view of a brake assembly.

Referring to Figure 1, a fluid motor designated generally by reference numeral 10 is arranged to spread the adjacent actuatable ends 12 and 14 of a pair of brake shoes 16 and 18. The actuatable ends of the shoes engage a fixed anchor 20 and are arranged to bear thereagainst during operation of the brake. Return springs 22 hold the ends of the shoes in a normally retracted position, which is the location wherein they engage the anchor 20.

The fluid motor 10 includes a cylinder 24, having a cylinder bore 26 and two oppositely-acting pistons 28 which are connected with the shoes through thrust links 30.

Figure 2:
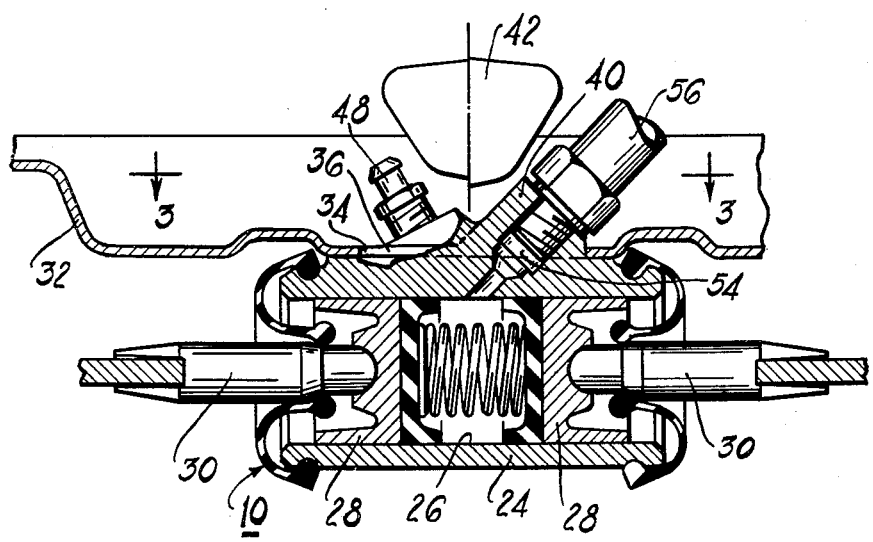
Figure 2 is a section view taken on the line 2—2 of Figure 1 with the bleeder boss and plug also shown to better illustrate the diverging arrangement of the inlet and bleeder bosses.

A support plate 32 is secured to a fixed part of the vehicle and is provided to laterally support the brake shoes. A semicircular opening 34 is formed in the backing plate to receive a pilot boss 36 located at the base of the fluid motor. Two additional bosses, a bleeder boss 38 and an inlet boss 40, project from the pilot boss 36. It will be noted in Figure 2 that the bosses divergently project from the pilot boss and form an angular space therebetween to provide room for the vertically located upper support arm 42. Because of the reduced clearance between the support arm 42 and support plate 32 (see Figure 2), it was previously impossible to locate a fluid motor in alignment with this upper support arm. This required rotation of the fluid motor either in a clockwise or counterclockwise direction from the position shown in Figure 1, so that the axis of the cylinder bore would no longer be parallel to the horizontal axis of the brake. In rotating the wheel cylinder, the entire brake was moved angularly including the brake shoes, one of which extended around the top of the brake and required additional support in a vertical sense.

The bleeder boss 38 has a passage 44 formed therein which intersects the cylinder bore at the uppermost level thereof (see Figures 1, 4, and 6). The passage 44 has a countersunk opening 46 which is threaded to receive a plug 48. As indicated in Figure 4, the bleeder boss and bleeder passage are located at a higher level of the fluid motor than the inlet boss 40. The inlet boss 40 has a passage 50 and a countersunk threaded opening 52 which is arranged to receive the threaded end 54 of the hydraulic feeder line 56. It will be noted that the inlet boss 40 is of greater length than the bleeder boss 38. A factor which determines the length of the boss 40 is the clearance between the shoulder 58 (Figure 5) and cylinder bore 26. When the boss 40 was given increased angularity to avoid the upper support arm 42, the effect of this angularity was to move the shoulder 58 closer to bore 26. This is compensated for by increasing the length of the boss 40 in order to displace the shoulder 58 farther from the cylinder bore 26.

In the base of the fluid motor, there are formed two tapped openings 60 which receive bolts or the like 62. The bolts 62 extend through openings in the backing plate 32 in order to attach the fluid motor to the support plate.

The base of the fluid motor which surrounds the pilot boss may be finished so that the fluid motor lies flat against the support plate 32. Although the bleeder and inlet bosses are formed larger than in the case with conventional wheel cylinders, it has not been necessary to increase the size of the fluid motor to accommodate this larger size boss.

Although the invention has been described in connection with but a single example embodiment, it will be apparent to those skilled in the art that numerous modifications and revisions of the invention may be made without departing from the underlying principles thereof. It is intended that such modifications and revisions of the invention be included within the scope of the following claims.

I claim:
1. A wheel cylinder construction and mounting, comprising a housing having a longitudinal cylinder bore, a base including a pilot boss substantially in the form of a D shape and disposed with the rectilinear portion of said D shape extending substantially the entire length of the wheel cylinder, means forming a seat surrounding said pilot boss and providing an engaging surface, an inclined inlet boss integral with said pilot boss and sloping away from said base as it extends toward the outer periphery of the pilot boss and terminating at said pilot boss outer periphery, an inlet passage through said inlet boss communicating with the cylinder bore by intersection therewith, an inclined bleeder boss disposed at the upper vertical level of said wheel cylinder and sloping away from said base as it extends toward the outer periphery of said pilot boss, said inlet and bleeder bosses defining therebetween an open angular space providing for adjacent interposition of a supporting structure, a supporting plate having a D-shaped opening through which said pilot boss is closely fitted to resist turning of the wheel cylinder and to engage said seat flatly against the region of said supporting plate surrounding said opening, and fastening means extending through said supporting plate and wheel cylinder base to clamp the seat of said wheel cylinder base tightly against the supporting plate and hold the pilot boss within its companion opening in said supporting plate.

2. A wheel cylinder construction and mounting, comprising a housing having a longitudinal cylinder bore, a base including a pilot boss substantially in the form of a D shape and disposed with the rectilinear portion of said D shape extending substantially the entire length of the wheel cylinder, means forming a seat surrounding said pilot boss and providing an engaging surface, an inclined inlet boss integral with said pilot boss and sloping away from said base as it extends toward the outer periphery of the pilot boss and terminating at said pilot boss outer periphery, an inlet passage through said inlet boss communicating with the cylinder bore by intersection therewith, an inclined bleeder boss disposed at the upper vertical level of said wheel cylinder and sloping away from said base as it extends toward the outer periphery of said pilot boss, said inlet and bleeder bosses defining therebetween an open angular space providing for adjacent interposition of a supporting structure, a supporting plate having a D-shaped opening through which said pilot boss is closely fitted to resist turning of the wheel cylinder and to engage said seat flatly against the region of said supporting plate surrounding said opening, two spaced internally threaded fastener openings provided at the lower edge of said wheel cylinder base and spaced one adjacent each of the open ends of said wheel cylinder, and fastening means received through said supporting plate and secured within said openings to clamp the seat of said wheel cylinder against the supporting plate and hold said pilot boss within its companion opening in said supporting plate.

3. A wheel cylinder construction and mounting, comprising a housing having a longitudinal cylinder bore, two oppositely acting pistons slidably received in said cylinder bore and each having an angularly movable thrust link bearing thereon, a base including a pilot boss substantially in the form of a D shape and disposed with the rectilinear portion of said D shape extending substantially the entire length of the wheel cylinder, means forming a seat surrounding said pilot boss and providing an engaging surface, an inclined inlet boss integral with said pilot boss and sloping away from said base as its extends toward the outer periphery of the pilot boss and terminating at said pilot boss outer periphery, an inlet passage through said inlet boss communicating with the cylinder bore by intersection therewith, an inclined bleeder boss disposed at the upper vertical level of said wheel cylinder and sloping away from said base as it extends toward the outer periphery of said pilot boss, said inlet and bleeder bosses defining therebetween an open angular space providing for adjacent interposition of a supporting structure, a supporting plate having D-shaped opening through which said pilot boss is closely fitted to resist turning of the wheel cylinder and to engage said seat flatly against the region of said supporting plate surrounding said opening, and fastening means extending through said supporting plate and wheel cylinder base to clamp the seat of said wheel cylinder base tightly against the supporting plate and hold the pilot boss within its companion opening in said supporting plate.

References Cited in the file of this patent

UNITED STATES PATENTS

| Number | Name | Date |
|---|---|---|
| 2,065,018 | Oliver | Dec. 22, 1936 |
| 2,125,266 | Begg | Aug. 2, 1938 |
| 2,138,205 | Rasmussen | Nov. 29, 1938 |
| 2,190,719 | Leighton | Feb. 20, 1940 |
| 2,293,600 | Eksergian | Aug. 18, 1942 |
| 2,336,352 | Goepfrich | Dec. 7, 1943 |
| 2,365,715 | Mattersdorf | Dec. 26, 1944 |
| 2,397,270 | Kelly | Mar. 26, 1946 |
| 2,724,460 | Brooks | Nov. 22, 1955 |
| 2,785,776 | Maina | Mar. 19, 1957 |
| 2,796,954 | Kaiser | June 25, 1957 |